United States Patent [19]

Dougherty

[11] 4,348,734

[45] Sep. 7, 1982

[54] CONVERTER BY STORED SWITCHING PATTERN

[75] Inventor: John J. Dougherty, Fanwood, N.J.

[73] Assignee: Reliance Electric Company, Cleveland, Ohio

[21] Appl. No.: 168,460

[22] Filed: Jul. 10, 1980

[51] Int. Cl.³ .......................................... G06F 15/34
[52] U.S. Cl. .................................. 364/721; 364/718; 328/14; 363/41
[58] Field of Search ................. 364/721, 718; 328/14, 328/27; 363/41; 318/807

[56] References Cited

U.S. PATENT DOCUMENTS

| | | | |
|---|---|---|---|
| 3,510,751 | 5/1970 | Resch | 363/42 |
| 3,657,657 | 4/1972 | Jefferson | 328/14 |
| 3,772,681 | 11/1973 | Skingle | 340/347 DA |
| 4,047,083 | 9/1977 | Plunkett | 318/807 |
| 4,095,275 | 6/1978 | Fluet | 364/721 |
| 4,099,109 | 7/1978 | Abbondanti | 318/811 |
| 4,202,236 | 5/1980 | Wilcox et al. | 84/1.03 |
| 4,203,543 | 5/1980 | Staiger et al. | 371/24 |
| 4,204,267 | 5/1980 | Kalinichenko | 363/85 |
| 4,210,962 | 7/1980 | Marsh | 364/402 |

OTHER PUBLICATIONS

Beveridge et al., *Optimization: Theory & Practice* McGraw-Hill, 1970, pp. 679-682 & 699-701.
Murphy et al. "Microprocessor Control of a PWM Invertor Induction Motor Drive" *IEEE Power Electronics Specialists Conference* 1979, pp. 344-348.

*Primary Examiner*—David H. Malzahn
*Attorney, Agent, or Firm*—Allan M. Lowe; Kenneth Watov

[57] ABSTRACT

A digital controller for a converter comprises a memory for storing digital representations of the switching patterns for operating the converter to produce a predetermined segment of each one of a plurality of waveforms, respectively, the memory being operable for repetitively outputting at least a selected one, or concurrently one per phase, of the switching patterns, the waveforms being divided into equal angled zones, a respective predetermined segment when oriented in phase and made of appropriate polarity, substantially approximating the portion of its associated waveform within any of the zones of this waveform; and a decoder receptive of the switching patterns from the memory, for selectively gating the digital signals thereof onto a plurality of control lines, in an iterative manner, for operating the converter to produce a desired waveform or polyphase related waveforms, with the segments of each zone thereof properly oriented in phase and polarity.

21 Claims, 16 Drawing Figures

*PRIOR ART*

Fig. 1

*PRIOR ART*

SWITCHING ANGLE

Fig. 7
A SINGLE PHASE

Fig. 8

Fig. 9
A
B TWO PHASE

Fig. 10

Fig. 11
A'
B' THREE PHASE
C'

CONVERTER BY STORED SWITCHING PATTERN

The field of the present invention relates generally to waveform synthesizers and converter systems, and more particularly to a method and digital control system for operating a converter to synthesize a desired waveform or polyphase related waveforms.

Many applications require that a DC voltage be converted into an AC voltage having a particular waveform, most often a sinusoidal waveform. Many different inverter and waveform synthesis systems are available for providing this function. These systems may be used to drive different types of AC loads, and are often adapted for driving AC motors over a range of different combinations of speed and torque. To perform this function, the synthesized AC voltage waveform, which is sinusoidal in this example, must be independently variable in frequency and amplitude, well regulated over a wide range of power levels, and adaptable to operate with either single or multiphase AC loads. It is also important that the synthesized waveform or polyphase waveforms be relatively free of harmonic components, in the limit approaching a pure sinusoidal waveform(s). As is known in the art, such waveforms can be synthesized using pulse width modulation (PWM) techniques for producing a synthesized step-like waveform equivalent of a desired waveform. Each half cycle of the synthesized waveform is chopped into a series of discrete pulses producing a notched waveform. The time occurrence and pulse widths of the individual pulses of the synthesized waveform are often controlled for reducing the harmonic content of the synthesized waveform. Also, many of the known control circuits for operating such waveform synthesizer and inverter systems derive control signals by the comparison of a sinewave reference signal or waveform with a triangular waveform, the latter having a frequency which is substantially higher than the former. The pulse trains of control signals derived from such comparison have pulse widths corresponding to the period of time between successive intercepts of the reference signal and timing signal when the timing signal is greater in amplitude than the reference signal. Such a control system can be found in Resch U.S. Pat. No. 3,510,751, issued on May 5, 1970, for producing a single level bipolar PWM synthesized sinewave. Also, in Plunkett U.S. Pat. No. 4,047,083, issued on Sept. 6, 1977, for a motor drive system including an inverter for producing a single tier bipolar PWM synthesized sinewave teaches control signal generator means utilizing the comparison of a sinewave reference signal with a triangular timing waveform.

Control systems for operating PWM converter systems for waveform synthesis are difficult to implement with digital circuitry. This difficulty partly arises from the fact that with the triangular comparison method, for example, the switching angles change with every increment in voltage, as will be shown. To develop a digital controller which produces variable frequency and variable voltage, a trade-off is required between large memory storage which offers the proper digital sampling resolution at a higher cost, and smaller memory which results in limited voltage variability or poor resolution with regard to the optimum triangular comparison control signal output. Analog control circuitry is used in many PWM converter systems, but such analog circuitry does not offer the cost savings and enhanced reliability possible from digital controllers implementing large-scale integrated logic networks. Such digital controllers would also provide reduced volume requirements, in comparison to analog circuitry. Also, the circuitry required for analog controllers increases in direct proportion to the number of phases of polyphase related waveforms being produced by the converter. In comparison, digital techniques offer substantially reduced increases in circuitry in polyphase systems.

In overcoming the problems of the prior art, the present inventor discovered a method and apparatus for digitally producing control signals for operating a converter to produce predetermined waveforms, the method comprising the steps of storing in memory a digital representation of one predetermined segment of each one of a plurality of waveforms desired for selective reproduction, the digital representation being the switching pattern for operating the converter to produce the predetermined segment of the selected waveform; selecting from memory at least a desired one of the switching patterns for the predetermined segments; decoding the switching pattern or patterns for digitally arranging the phase and polarity of each segment, respectively, to correspond to a desired portion of the respective waveforms being reproduced; and repeating the latter two steps as required for assembling digital representations of the entire switching pattern for a desired waveform or polyphase related waveforms for driving a converter to produce a desired waveform or waveforms.

In the drawings, wherein like elements have the same reference designation.

Figure 1:
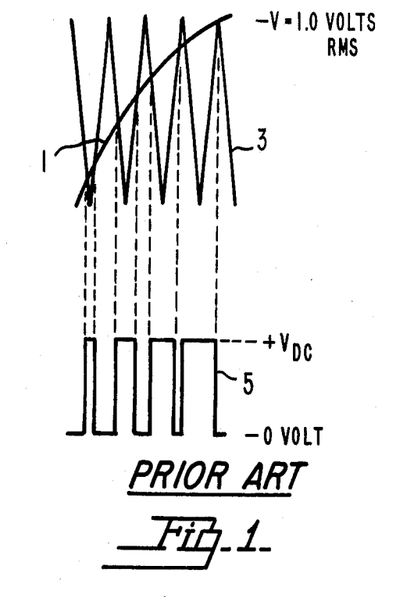
FIGS. 1 and 2 are waveform diagrams of a prior art triangular comparison method for obtaining control signals for operating a converter.
Figure 2:
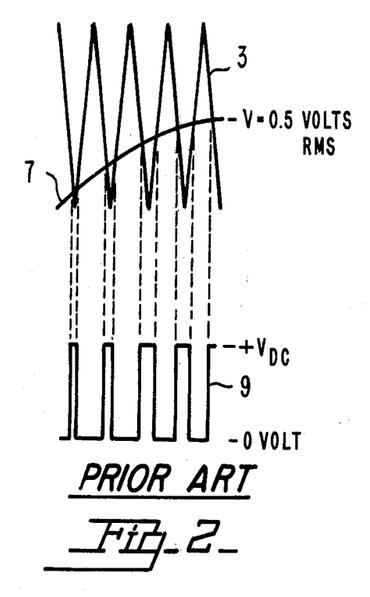

In FIG. 1, a quarter-cycle segment of a one-volt sinusoidal reference waveform 1 is compared with a substantially higher frequency triangular timing waveform 3, for producing a train of pulses 5. Note that the widths of the individual pulses of the pulse train 5 correspond to the periods of time that the amplitude of the reference sinusoid 1 exceeds the amplitude of the triangular waveform 3, as previously mentioned. In FIG. 2, 0.5 volt reference sinusoid 7 is compared with the timing waveform 3, to produce the pulse train 9 having pulse widths that are substantially less than those of pulse train 5, for the reasons given above. In conventional analog control systems for converters, the pulse trains 5 and 9 are decoded to provide the control signals for operating the particular converter. As indicated above, the change in the switching angle or pulse widths of these pulse trains, with each incremental change in voltage of the reference waveform complicates the application of digital techniques for implementing the triangular comparison method.

Since digital circuitry operates in discrete states, typically a first DC level representing a digital "1", and a second level of voltage, such as zero volt representing a digital "0", for example, a system design which consists largely of repeatable discrete operations optimizes the required digital circuitry. Analog functions can be simulated in digital circuitry in this manner, however, the sample rate typically must be much higher than the frequency of the analog functions for good resolution. To overcome this problem the present inventor mathematically samples a desired waveform at fixed angle intervals, at a relatively low sample frequency, as will be shown. Accordingly, optimization of required digital circuitry is obtained for the present invention.

Figure 3:
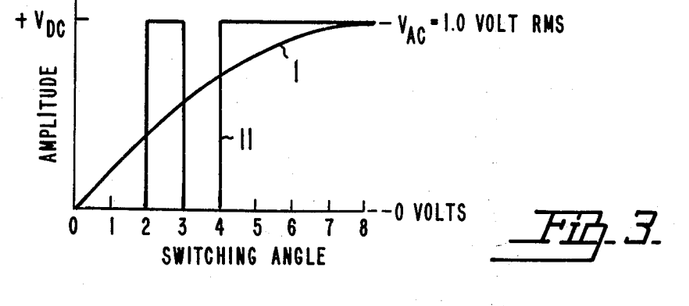
FIGS. 3 and 4 are waveform diagrams showing the equal angle method or fixed angle interval method that is one element of one embodiment of the present invention.
Figure 4:
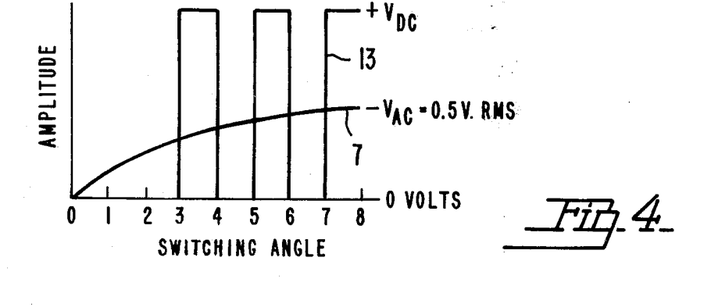
Figure 5:
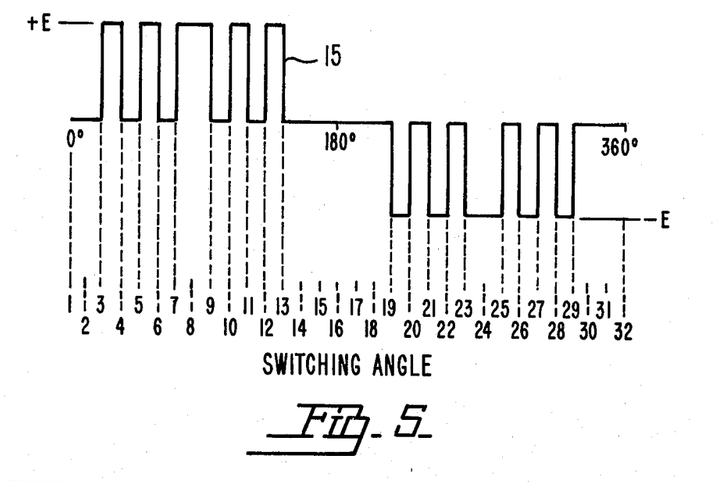
FIG. 5 is a waveform diagram of a synthesized sinewave, for example, produced by a converter driven by the digital controller of the present invention.

In FIG. 3, a quarter-cycle waveform of the sinewave 1 is divided into eight equally spaced switching angles. The switching pattern 11 for synthesizing this quarter-cycle of a sinewave 1 is shown as a pulse or step-like waveform having a first pulse between switching angles 2 and 3, and a second pulse between switching angles 4 and 8. In this example, the maximum amplitude of the sinewave 1 is shown as 1.0 volts rms. In FIG. 4, a quarter-cycle of the sinewave 7 having a maximum amplitude of 0.5 volt rms is sampled using the previously described equal angle method resulting in switching pattern 13 having pulses between switching angles 3 and 4, 5 and 6, and 7 and 8. As would be expected, the area under the pulse train or switching pattern 13 is about half of that under the switching pattern 11. Such switching patterns as 7 and 11, can be used to drive a converter for producing a synthesized sinusoidal waveform, for example, as shown in FIG. 5. Note that in FIG. 5 there are 32 equally spaced switching angles, eight angles for each quarter-cycle of the synthesized waveform, whereby the respective quarter-cycle switching pattern has been appropriately oriented in phase and polarity for each quarter-cycle of the waveform. In other words, the pulse-like synthesized sinewave 15 in this example has an amplitude varying over $+E$ and $-E$ volts and is a composite of one quarter-cycle switching pattern appropriately oriented in phase and polarity for each quater cycle of the waveform 15.

Accordingly, as shown in FIGS. 3 and 4, by dividing a sinewave, in this example, into a fixed number of equally spaced switching angles, the switching pattern for each sinewave of a different amplitude has the same switching angle possibilities, but not the same switching pattern. Also, as previously mentioned, by constraining the switching angles to fixed increments, the digital circuit implementation for accomplishing this is greatly simplified. The quarter-cycle symmetry of a sinewave requires that only the appropriate one of the two possible switching states ("1" or "0") between each one of the switching angles be stored in memory for directly providing control signals (the switching pattern) for operating a converter to simulate a given quarter-cycle segment of a sinewave. The switching pattern is accessed from memory in the proper sequence and gated onto appropriate control lines for operating the converter to synthesize each quarter-cycle of the given sinewave from one quarter-cycle segment thereof. As will be shown, the digital circuitry of the present invention must address the memory in the proper sequence, decode the quadrant for proper polarity and operate the transistor or other type switches of the converter for providing the desired synthesized waveform.

Figure 6:
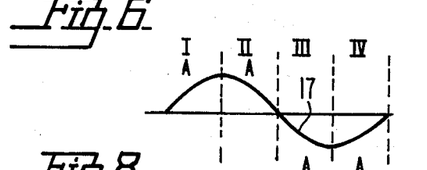
FIG. 6 is a waveform diagram for a typical sinewave.
Figure 7:
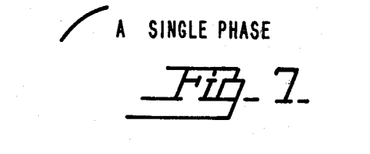
FIG. 7 is an illustration of one segment of the waveform of FIG. 6.
Figure 8:
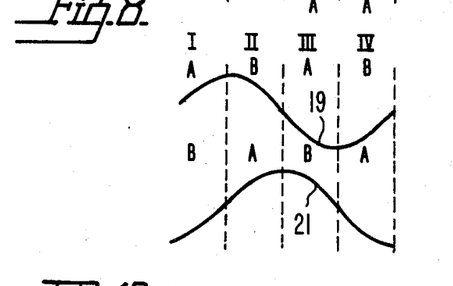
FIG. 8 includes waveform diagrams of two-phase related sinewaves.
Figure 9:
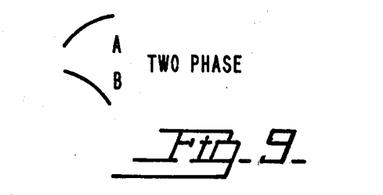
FIG. 9 includes two different segments of the waveforms of FIG. 8.
Figure 10:
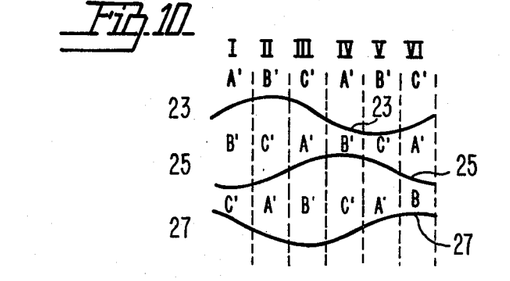
FIG. 10 includes the waveforms of typical three-phase related sinewaves.
Figure 11:
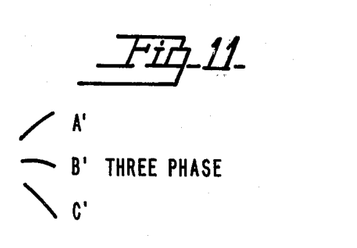
FIG. 11 includes three different 60° segments of the waveforms of FIG. 10.

In FIG. 6, a single-phase sinewave is shown divided into four equally spaced zones, I, II, III, and IV. Each segment of the sinewave 17 is equivalent to a segment A, as shown in FIG. 7. In other words, to reproduce the sinewave 17, all that is required is that a quarter-cycle segment A be oriented in the appropriate phase and made of the appropriate polarity in each one of the four zones for producing the sinewave 17. Similarly, in FIG. 8, two-phase related sinewaves 19 and 21 are divided into four equal zones, and each can be constructed from two segments A and B, as shown in FIG. 9. In FIG. 10, three-phase related sinewaves 23, 25, and 27 are divided up into six equal zones, I through VI, respectively, each zone covering 60 degrees of the waveforms. In FIG. 11, the three 60 degree segments of the waveforms 23, 25, 27, shown as A', B', and C', can be used for constructing the three-phase related waveforms 23, 25, 27, as shown in FIG. 10. Accordingly, the present inventor discovered that only a 90 degree segment of a single phase sinewave need be stored in memory for reproducing that sinewave, or two different 90 degree segments of two-phase related sinewaves be stored in memory for reproducing those sinewaves, and only three different 60 degree segments of three-phase related sinewaves may be stored in memory for reproducing the three-phase sinewaves, in a digital system to be described below. The present inventor further discovered that instead of storing an actual digital representation of the analog segment, much circuitry could be eliminated by directly storing the required switching pattern of the particular converter for controlling the inverter to reproduce the particular segment or synthesize the particular segment.

In order to provide switching patterns for controlling a converter to produce optimized synthesized waveforms of sinewaves, in this example, to substantially the closest approximation possible, thereby reducing harmonics, the present inventor applied a mathematical approach known as "Dynamic Programming". Dynamic Programming is a sequential process in which each of a series of locations, switching angles in this example, are tested. At each location, all possible states (discrete voltage levels or pulses in the incremental area thereof) are compared with the best resultant (simulated area with actual or desired area from zero degrees to a current location or switching angle) from the past locations. In the Dynamic Programming technique for synthesizing sinewaves, the choice of a discrete voltage level at each switching angle is optimized by minimizing the absolute value of the accumulated error between the area under the curve of the ideal sinewave and the area under the simulated or synthesized step waveform thereof. This optimization is performed at each switching angle sequentially from zero degrees to 90 degrees in single, two-phase, and three-phase systems, using the results of the previous switching angle. In Dynamic Programming terms, this is called the recurrence equation. The equation derived by the present inventor is as follows:

$$G_x(y) = \left| \left( V_p(1 - \cos x) - \left( SA(x - I) + y^V \text{step} \frac{I}{90} \right) \right) \right| \quad (1)$$

where y is the voltage step; $Y = 0, 1, \ldots n-1$; n is the number of voltage steps; x is the current switching angle; I is the switching angle increment; $SA(X-I)$ is the simulated area from 0° to switching angle $(x-I)$ for voltage steps of 0 through n; Vp is the peak amplitude of the ideal sinewave, and $V_{step}$ is the voltage level increment associated with each of the n steps. By solving equation 1 for each y at location x, the optimum voltage step for the previous switching angle $(x-I)$ is selected for each voltage step at switching angle x. After sequentially solving this equation from 0° to 90°, the minimum error at 90° is used to select the voltage level at 90°. In the above examples, n is either 0 or 1, i.e., either no step or pulse at x, or a step or a pulse at x, respectively. In converter systems capable of producing multi-step waveforms, n can be any whole integer number equivalent to a number of voltage steps at the switching angle x that is being tested for optimizing the waveform. By starting at 90°, voltage levels at all switching angles can be found by stepping backwards through the switching angles. Note that the recurrence relation finds the optimum voltage step at the $(x-I)$ switching angle for each voltage step at switching angle x. This equation minimizes the number of steps required at each switching angle while optimizing the accurate synthesis of the desired waveform. Note that for the waveforms of FIGS. 3, 4, and 5, n is taken as either 0, or 1, at each switching angle. For the switching pattern of FIG. 14, n is taken as 0, 1, or 2, at each switching angle for obtaining the optimum switching pattern. The number of steps n that are to be tested at any given switching angle is dependent upon the capability of the particular converter, that is, the number of steps that a particular converter is capable of producing at any given switching angle must be taken into consideration, as discussed above.

As previously mentioned, due to the quarter-cycle symmetry of a sinewave, for example, only a quarter-cycle need be mathematically simulated. Once the set of switching patterns representing a complete range of discrete voltages has been calculated via the Dynamic Programming approach, these patterns can be stored in a digital memory, such as a semiconductor memory, for example, for sequential recall in a digital circuit implementation, as will be shown. Note that two methods can be used for storing the voltage information. One method is to store an entire waveform, in this example, the entire switching pattern for operating a converter to produce a synthesized waveform. This minimizes the digital decoding circuitry, however, large memory spaces for storage are required. A second and preferred approach utilizes the partitioning of each quadrant or zone into even increments or equally spaced switching angles. As will be shown, a simple ripple counter can be used to decode the quadrant or zone information. Zone decoder circutry can then be used to switch the output or switching pattern from the memory into the proper phase and polarity for synthesizing the section of the waveform in the zone being processed. Also, as previously shown, in comparing FIGS. 6 through 11, in polyphase designs further storage reductions are possible, whereby in a three-phase system only three different 60° zones or switching patterns of three-phase related waveforms are required to be stored, for later retrieval and hextant decoding to provide control signals for operating a converter to produce synthesized waveforms of the three-phase related waveforms.

Figure 12:
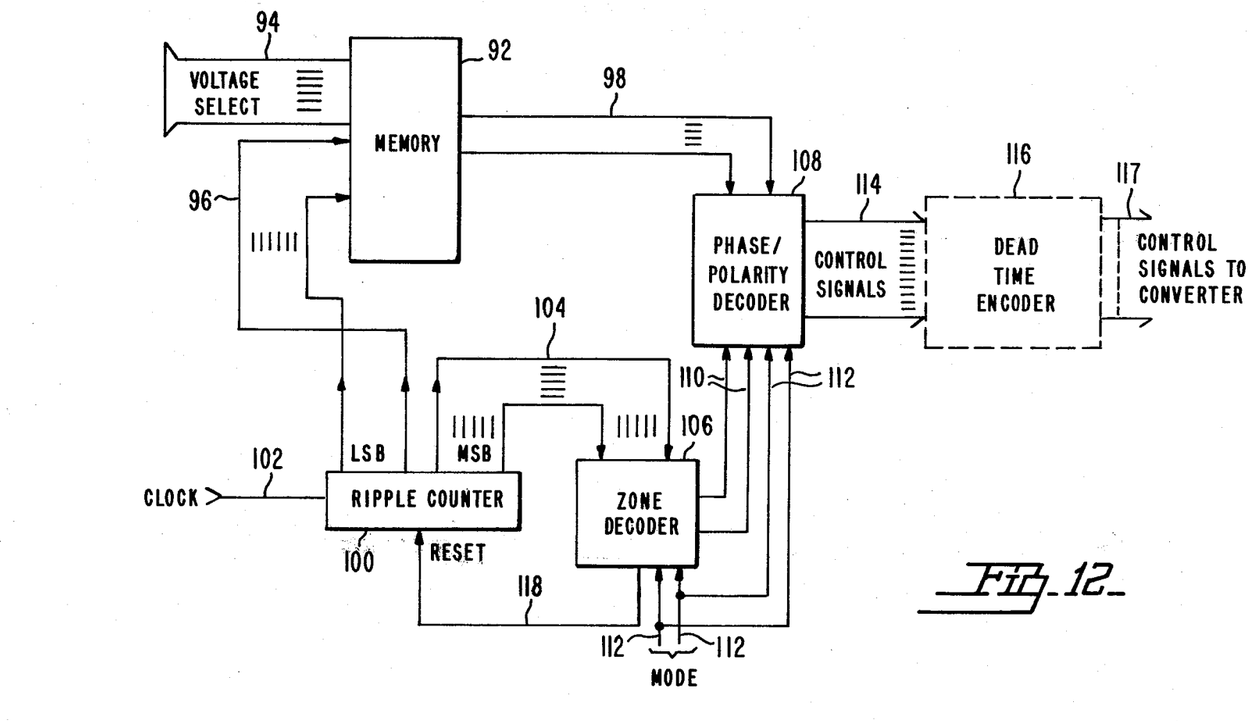
FIG. 12 is a block diagram of a digital controller of one embodiment of the present invention.
Figures 13, 14:
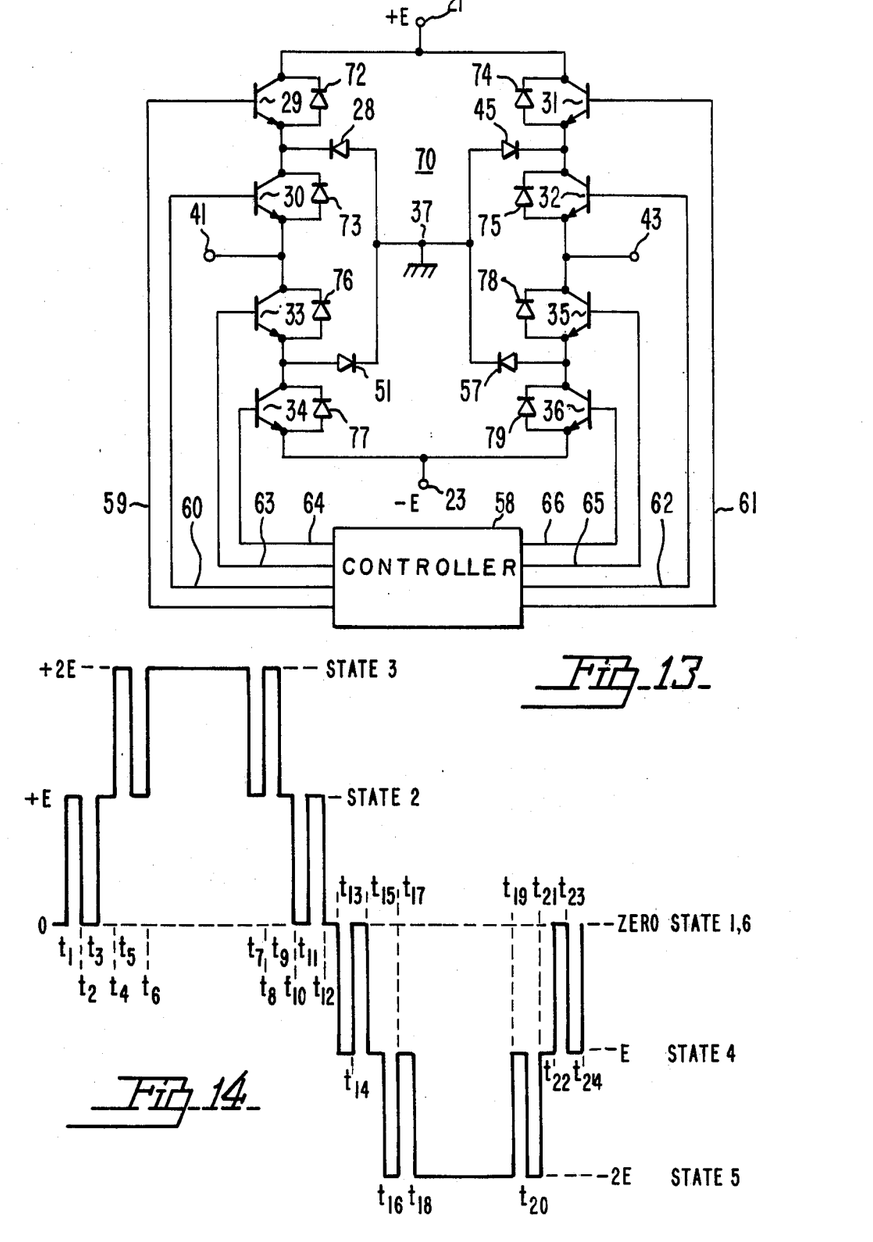
FIG. 13 is a partial circuit schematic diagram of a single phase inverter system capable of being driven by the digital controller of the present invention.
FIG. 14 includes typical waveforms produced by the inverter of FIG. 13.
Figure 15:
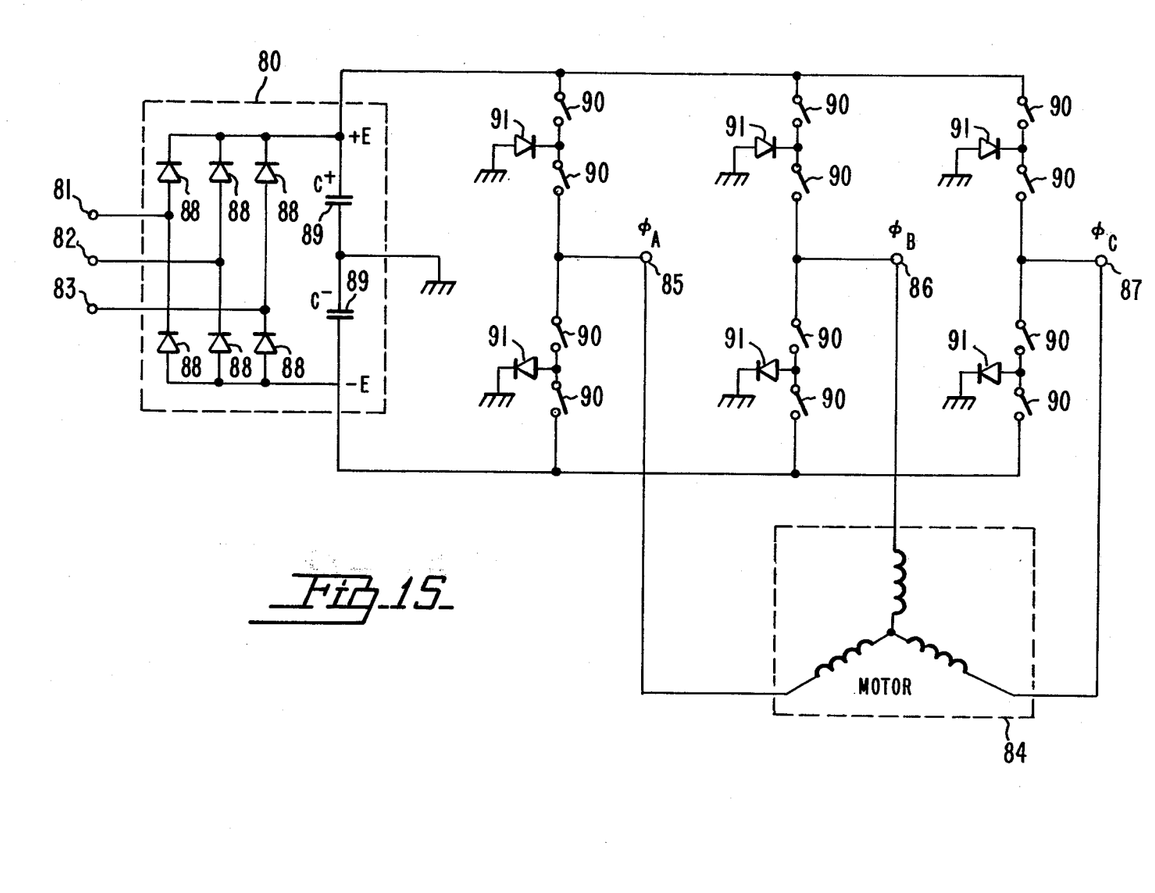
FIG. 15 is a circuit schematic diagram of an expanded version of the inverter of FIG. 13 for providing polyphase voltages.

In FIG. 12, a block diagram of a digital network for carrying out the method of the present invention, is shown a memory 92 for storing the switching patterns for operating a given converter preferably of a type illustrated in FIGS. 13 and 15 to produce desired single or polyphase synthesized waveforms. For example, the switching patterns may be representative of synthesized sinewaves of different amplitudes in a single-phase application, or a given plurality of the switching patterns may be grouped for synthesizing polyphase related waveforms, each group being representative of a given amplitude. In this example, voltage select lines 94, are provided for addressing a particular block of memory, for accessing the single phase or polyphase switching patterns for synthesizing a desired waveform or waveforms. The memory 92 is responsive to cycling signals via cycling lines 96 for clocking out the selected switching patterns onto waveform data lines 98.

A ripple counter 100 is responsive to a clock signal provided on a clock line 102, for providing the cycling signals on lines 96 via its least significant bit lines (LSB) to the memory 92, and zone signals on lines 104 to a zone decoder 106 via its most significant bit (MSB) output lines. Also included in this example is a phase/polarity decoder 108 receiving zone data lines 110 from the zone decoder 106, and externally supplied mode signals via lines 112. The phase/polarity decoder provides control signals over control signal lines 114 for operating the given converter to produce the desired waveform or waveforms. In certain applications, a dead time encoder 116, shown in phantom, may be required to prevent the simultaneous conduction of certain switches of a given converter, for avoiding a fault condition, as will be described.

Operation of the digital controller of FIG. 12 is now described. The particular shape of the desired waveform, in this example a sinewave, and the amplitude thereof, is selected by addressing the memory 92 via the voltage select lines 94. The mode lines 112 are used to provide signals indicating whether a single phase or polyphase related waveforms are to be produced. A clock signal, typically a pulse train, is provided on clock line 102 for operating the ripple counter 100. The frequency of the clock signal is given by as follows:

$$f = NF \quad (2)$$

where f is the frequency of the pulse train of the clock signal, N is the number of angles per cycle of the synthesized waveform or polyphase related waveforms, and F is the output frequency of the output waveform(s). The LSB output lines 96 of the ripple counter 100 provide the cycling or segment sequencing signals to the memory, for clocking out the switching pattern for that segment onto the waveform data lines 98. The MSB output lines 104, provide the zone sequencing signals 104 to the zone decoder 106. The zone decoder provides a reset signal over line 118 to the ripple counter 100 each time a particular switching pattern has been completed for a given zone, causing the ripple counter to repetitively output over the waveform data lines 98 the switching pattern for the segment or segments selected via the voltage select lines 94. The zone decoder 106 also provides zone sequencing signals over lines 110 to the phase polarity decoder 108, for programming the decoder to gate the switching pattern for the particular segment or segments of interest onto the appropriate control signal lines 114 for ensuring that the segment being reproduced is in the proper phase and polarity as to the zone of the waveform being reproduced at that time. In other words, the phase polarity decoder 108 is responsive to both the mode signals on lines 112, and the zone sequencing signal on lines 110, for arranging the switching pattern onto different ones of the control signal lines 114 at a given time, for causing the converter to produce the segment represented by the switching pattern in the proper phase and polarity for the zone of the waveform or waveforms being reproduced at that time. In many applications, the control signals provided on control signal lines 114 from the phase polarity decoder 108 can be applied directly to the converter for operating the switches of the converter to produce the desired waveform(s). However, as previously explained, the dead time encoder 116 may be required in other applications for operating certain types of converters.

FIG. 13 is a circuit schematic diagram of a single phase inverter system controlled by a controller 58. The controller 58 can be provided by the present invention, for example, to operate the switches 29 through 36 of the inverter 70, for producing the four-step waveform of FIG. 14. The diodes 28, 45, 51 and 57, provide gated current or ground paths in certain switching configurations of the inverter 70. The anti-parallel diodes 72 through 79 provide bidirectional current flow for inductive loads connected across the output terminals 41 and 43, in a manner known in the art. Operating voltage terminals 21 and 23 are provided for receiving operating voltages +E and −E, respectively. A reference terminal 37 is provided for receiving a source of reference potential, ground in this example. The digital controller 58, in this example, provides control signals via individual control lines 59 and 66, which lines are representative of the plurality of control lines 117 shown in FIG. 12 for the digital controller.

In FIG. 15, the single phase converter 70 of FIG. 13 is expanded into a three-phase inverter system by the addition of a third leg of switches. The digital controller of FIG. 12 can be programmed for operating this polyphase inverter. As shown, the inverter of FIG. 15 includes a three-phase rectifier 80, a plurality of switches 90 (transistor switches), gated ground path didoes 91, and output terminals 85, 86, and 87, for providing polyphase voltages to a three-phase motor 84. Operation of the inverter circuits of FIGS. 13 and 15 is given in detail in a co-pending application, U.S. Ser. No. 63,347, for "Bridge Converter Circuit", filed on Aug. 2, 1979, now U.S. Pat. No. 4,270,163, issued May 26, 1981. The reference designations shown in FIGS. 13, 14 and 15 correspond to the reference designations given in this co-pending application. Accordingly, a detailed explanation of the operation of these inverters is incorporated herein by reference from the co-pending application.

Figure 16:
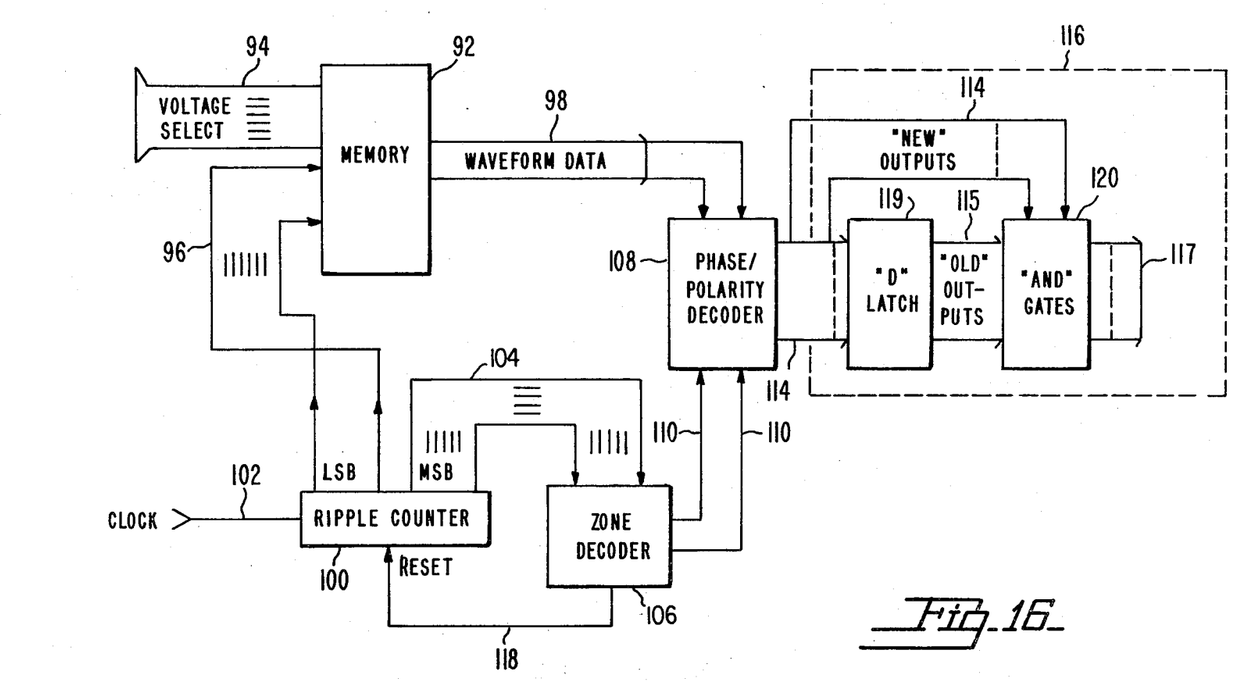
FIG. 16 is a block diagram of another embodiment of the present invention.

The inverter circuits of FIGS. 13 and 15 require that no more than two switches in any given leg thereof be concurrently conducting or turned on, to avoid a fault condition. For example, in FIG. 15 if the uppermost three switches 90 in any given leg are concurrently closed or turned on, the source of the operating voltage +E will be shorted to ground via the current path provided by the three closed switches and the lower diode 91 of each leg. Similarly, if the lowermost three switches 90 in each leg of the inverter of FIG. 15 are concurrently closed, the source of the operating voltage −E will be shorted to ground via the current paths provided by the closed switches 90 and the upper diode 91 of each leg. As previously explained, to avoid such fault conditions, a dead time encoder 116 must be provided. In FIG. 16, one example of a dead time encoder for operating inverter circuits such as those of FIGS. 13 and 15, is shown. As shown, the control signal lines 114 are connected to both the input terminals of a "D-Latch" 119, and as one input to a plurality of "AND" gates 120, respectively. The output signal lines from the "D-Latch" 119 are referenced as "Old Outputs" 115, and are provided as the other input signals to the "AND" gates 120, respectively. The output lines from the "AND" gates 120 provide the control signal lines 117 to the inverters of either FIGS. 13 or 15, in this example. Also, the control signal lines 114 and the "AND" gates 120 are labeled as "New Outputs". The function of the "D-Latch" or data latch 119 is to ensure that the old outputs 115 change to correspond to the levels of the new outputs 114 only at particular clock times. The combination of the "D-Latch" 119 and the "AND" gates 120 ensures that the output signals from the phase/polarity decoder 108 are delayed in going from low to high, or a digital 0 to a 1, but not delayed in going from high to low, or 1 to 0, for operating the switches of the inverters of FIGS. 13 and 15 in a proper sequence to prevent simultaneous conduction of three transistors, which causes a fault condition, as previously explained. In this manner, a dead time is provided between switching of the switches of the respective inverters of FIGS. 13 and 15.

Although in this example, the shape of the waveforms of interest is shown as sinewaves, the digital controller of FIG. 12 and method of the present invention can be applied for producing control signals for operating a converter to produce synthesized waveforms other than a sinewave. The memory 92 would then store the switching pattern for the smallest segment of the desired waveform capable of being repetitively retrieved from memory for accurately assembling the entire waveform from the single segment, as previously described. For a given waveshape, the size of the segment, that is the number of degrees of the wave form represented by the segment may differ from waveshape to waveshape.

What is claimed is:

1. A method for digitally producing control signals for operating a converter to produce predetermined waveforms, comprising the steps of:
   (1) storing in memory a digital representation of one predetermined segment of each one of a plurality of waveforms desired for selective reproduction, each segment being divided into a fixed number of equally spaced switching angles, said digital representation being the switching pattern for operating said converter to synthesize said predetermined segment of a selected waveform;

(2) selecting from memory at least a desired one of the switching patterns for said predetermined segments;

(3) decoding the switching patterns(s) for digitally arranging the phase and polarity of each segment, respectively, to correspond to a desired portion of the respective waveform(s) being reproduced;

(4) repeating steps (2) and (3) as required for assembling digital representations of the entire switching pattern for a desired waveform(s) for driving said converter to synthesize the desired waveform(s).

2. The method of claim 1, wherein step (1) further includes storing one switching pattern for at least a predetermined quarter-cycle segment of a single-phase sinusoidal waveform, and the switching patterns for at least two succeeding quarter-cycle segments of at least one of sinusoidal two-phase related waveforms, for producing control signals for driving a single or two-phase converter, respectively.

3. The method of claim 1, wherein step (1) further includes storing the switching patterns for at least three succeeding predetermined sixth-cycle segments of at least one waveform of sinusoidal three-phase related waveforms, for producing control signals for driving a three-phase converter.

4. The method of claim 1 wherein step (1) further includes storing the switching patterns for one predetermined segment of each one of a plurality of waveforms having either one of different waveshapes and like amplitudes, different waveshapes and unlike amplitudes, and similar waveshapes and unlike amplitudes.

5. The method of claim 4, wherein step (1) includes storing the switching patterns for segments of sinusoidal waveforms.

6. The method of claim 1, wherein step (1) further includes the step of developing via the technique of Dynamic Programming an equation for each particular waveshape of said waveforms, for permitting optimization of the least number of bits required for digitally representing the switching patterns of said segments to a desired degree of accuracy.

7. An apparatus for digitally producing control signals for operating a converter to produce step-like approximations of predetermined waveforms, comprising:
memory means for storing digital representations of the switching patterns for operating said converter to produce a predetermined segment of each one of a plurality of waveforms, respectively, said memory means being operable for repetitively outputting either at least a selected one or concurrently one per phase, of said switching patterns, each one of said waveforms being divided into equal angled zones, a respective predetermined segment when oriented in phase and made of appropriate polarity, substantially approximating the portion of its associated waveform within any of the zones of this waveform; and
decoding means receptive of said selected switching pattern(s) from said memory means, for gating the digital representations of the switching pattern(s) onto particular ones of a plurality of control lines, for operating said converter to produce said segment(s) of the desired waveform(s) in a given zone, and with the appropriate phase and polarity, in an iterative manner, for producing an entire cycle of either one of a desired waveform or polyphase related waveforms.

8. The digital controller of claim 7, wherein said memory means includes:
a plurality of blocks of memory, each block being capable of storing either one of at least the switching pattern for one of said predetermined segments, in operating a single-phase converter, or the switching patterns of one predetermined segment of each one of polyphase related waveforms, or of a predetermined number of segments of successive zones of one waveform of polyphase related waveforms, the number of segments being equal to the number of phases, in operating a polyphase converter;
voltage select means responsive to a voltage select signal, for addressing a particular one of said blocks of memory; and
sequencing means responsive to a segment sequencing signal for clocking out at least one switching pattern from a selected block onto a plurality of output data lines.

9. The digital controller of claim 8, wherein said decoding means includes:
zone decoding means responsive to a zone sequencing signal, for producing a zone signal indicative of the zone of either one of a waveform or waveforms being produced by said converter; and
phase and polarity decoding means having input terminals connected to said output data lines of said memory means, responsive to said zone signal, and to a mode signal indicative of single or polyphase converter operation, for controlling the connection of said output data lines to said control lines, for operating said converter to produce said desired waveforms.

10. The digital controller of claim 9, further including:
ripple counter means responsive to a clock signal, for producing said segment sequencing signal, and said zone sequencing signal, as least significant bit, and most significant bit output signal groupings, respectively, the frequency of said clock signal being directly proportional to and controlling the frequency of the synthesized waveforms produced by said converter.

11. The digital controller of claim 7, 8, or 9 further including:
encoding means having a plurality of input terminals connected to said control lines, respectively, from said decoding means, and having output terminals connected to said converter, for ensuring that the individual digital representations of the switching patterns supplied to the converter are delayed in changing state from a low to a high level for each turning on a particular switch of the converter, but not from a high to a low level, for operating switches of the converter in a proper sequence to prevent fault conditions.

12. The digital controller of claim 7, wherein said memory means stores one switching pattern for at least a predetermined quarter-cycle segment of a single-phase sinusoidal waveform, and the switching patterns for at least two succeeding quarter-cycle segments of at least one of sinusoidal two-phase related waveforms, for in combination with said decoder means producing control signals for driving a single or two-phase converter, respectively.

13. The digital controller of claim 7, wherein the memory means stores the switching patterns for segments within three succeeding zones of at least one waveform of sinusoidal three-phase related waveforms, wherein each zone is 60°, with six such zones per waveform, for in combination with said decoder means producing control signals for driving a three-phase sinusoidal converter.

14. Apparatus for deriving an N-phase periodic waveform from a DC power source, where N is a positive integer, comprising a switching converter having N branches responsive to the DC source, branch k including switch means and an output tap on which is derived the waveform of phase k, where k is selectively every one of N, means for controlling the activation of the switch means of branch k, said controlling means including a memory for storing a control pattern for the switch means of branch k for a portion of one period of the waveform, the duration of each portion being related to N, each portion having a duration equal to the same integral subdivision of the period, each portion being subdivided into plural equal length intervals, means for cycling the memory so that during each interval the switch means of branch k is activated to a combination of conditions to control the amplitude of the voltage applied by the source to the tap, the pattern controlling the combination of conditions over all of the intervals forming a portion, the memory being activated by the means for cycling to repeat the control pattern with different phases during successive portions of the same cycle of the waveform.

15. The apparatus of claim 14 where N=1, and each portion has a duration of one-quarter of a period of the waveform.

16. The apparatus of claim 14 where N has a value of at least three, and each portion has a duration of 180°/N.

17. The apparatus of claim 14, 15 or 16 further including means for preventing simultaneous closing of certain switches in branch k as transitions occur between adjacent intervals, said certain switches, if simultaneously closed, having a tendency to cause a fault condition.

18. Apparatus for controlling a switching converter for deriving an N-phase periodic waveform from a DC power source, where N is a positive integer, said converter having N branches responsive to the DC source, branch k including switch means and an output tap on which is derived the waveform of phase k, where k is selectively every one of N, the controlling apparatus comprising: means for controlling the activation of the switch means of branch k, said controlling means including a memory for storing a control pattern for the switch means of branch k for a portion of one period of the waveform, the duration of each portion being related to N, each portion having a duration equal to the same integral subdivision of the period, each portion being subdivided into plural equal length intervals, means for cycling the memory so that during each interval the switch means of branch k is activated to a combination of conditions to control the amplitude of the voltage applied by the source to the tap, the pattern controlling the combination of conditions over all of the intervals forming a portion, the memory being activated by the means for cycling to repeat the control pattern with different phases during successive portions of the same cycle of the waveform.

19. The apparatus of claim 18 where N=1, and each portion has a duration of one-quarter of a period of the waveform.

20. The apparatus of claim 18 where N has a value of at least three, and each portion has a duration of 180°/N.

21. The apparatus of claim 18, 19 or 20 further including means for preventing simultaneous closing of certain switches in branch k as transitions occur between adjacent intervals, said certain switches, if simultaneously closed, having a tendency to cause a fault condition.

* * * * *